United States Patent
Shinoda et al.

(10) Patent No.: US 11,103,823 B2
(45) Date of Patent: Aug. 31, 2021

(54) FILTER BACKWASHING UNIT, CHAR RECOVERY UNIT, METHOD OF FILTER BACKWASHING, AND INTEGRATED GASIFICATION COMBINED CYCLE

(71) Applicant: MITSUBISHI HITACHI POWER SYSTEMS, LTD., Yokohama (JP)

(72) Inventors: Haruto Shinoda, Kanagawa (JP); Yoshinori Koyama, Tokyo (JP)

(73) Assignee: MITSUBISHI POWER, LTD., Yokohama (JP)

(*) Notice: Subject to any disclaimer, the term of this patent is extended or adjusted under 35 U.S.C. 154(b) by 518 days.

(21) Appl. No.: 16/061,476

(22) PCT Filed: Dec. 12, 2016

(86) PCT No.: PCT/JP2016/086942
§ 371 (c)(1),
(2) Date: Jun. 12, 2018

(87) PCT Pub. No.: WO2017/104624
PCT Pub. Date: Jun. 22, 2017

(65) Prior Publication Data
US 2020/0269176 A1    Aug. 27, 2020

(30) Foreign Application Priority Data
Dec. 18, 2015  (JP) .............................. JP2015-247868

(51) Int. Cl.
*B01D 46/00* (2006.01)
*B01D 45/12* (2006.01)
(Continued)

(52) U.S. Cl.
CPC ......... *B01D 46/0068* (2013.01); *B01D 29/15* (2013.01); *B01D 45/12* (2013.01);
(Continued)

(58) Field of Classification Search
CPC ......... C10J 3/84; B01D 29/15; B01D 46/0068
See application file for complete search history.

(56) References Cited

U.S. PATENT DOCUMENTS 3,204,766 A * 9/1965 Schmidt, Jr. ........... B01D 29/33
210/86
3,577,705 A * 5/1971 Sharlit ............... B01D 46/0067
95/2

(Continued)

FOREIGN PATENT DOCUMENTS

CN    102782267 A    11/2012
CN    103068703 A    4/2013
(Continued)

OTHER PUBLICATIONS

International Search Report dated Jan. 10, 2017, issued in counterpart International Application No. PCT/JP2016/086942 (2 pages).
(Continued)

*Primary Examiner* — Matthew J Merkling
(74) *Attorney, Agent, or Firm* — Westerman, Hattori, Daniels & Adrian, LLP (57) ABSTRACT

A filter backwashing unit is disposed in a path in which process gas flows to remove at least a part of trapped dust included in a process gas by backwashing an element of a filter device that traps the dust when a process gas passes. The filter backwashing unit includes a gas injection device disposed downstream of the element in a flow direction of a process gas to inject backwashing gas toward the element from downstream; a parameter detection device configured to detect a parameter used for determination of a state of dust adhering to the element; and a control device configured to estimate a thickness of dust deposited on a surface of the element upstream of a process gas based on a result of the
(Continued)

detection, and determine an interval at which the element is backwashed based on the estimated thickness of the dust.

2 Claims, 5 Drawing Sheets

(51) Int. Cl.
    *B01D 46/44*     (2006.01)
    *B01D 46/46*     (2006.01)
    *B01D 50/00*     (2006.01)
    *F01K 23/06*     (2006.01)
    *F02C 3/28*     (2006.01)
    *C10J 3/84*     (2006.01)
    *B01D 29/15*     (2006.01)

(52) U.S. Cl.
    CPC ........... *B01D 46/442* (2013.01); *B01D 46/46* (2013.01); *B01D 50/002* (2013.01); *C10J 3/84* (2013.01); *F01K 23/067* (2013.01); *F02C 3/28* (2013.01)

(56) References Cited

U.S. PATENT DOCUMENTS

| | | | | |
|---|---|---|---|---|
| 4,070,288 A * | 1/1978 | Gerteis | ................ | B01D 35/143 210/767 |
| 4,865,627 A * | 9/1989 | Dewitz | ................ | B01D 50/002 95/12 |
| 5,198,002 A * | 3/1993 | Mei | ................... | B01D 46/0083 422/177 |
| 5,531,798 A * | 7/1996 | Engstrom | ............ | B01D 46/002 110/345 |
| 2006/0283355 A1 | 12/2006 | Knowles | | |
| 2009/0101598 A1 * | 4/2009 | Kain | ........................ | C10K 1/10 210/771 |
| 2013/0000282 A1 | 1/2013 | Takayanagi et al. | | |
| 2013/0140168 A1 | 6/2013 | Koyama et al. | | |
| 2014/0231239 A1 | 8/2014 | Koyama et al. | | |
| 2015/0239684 A1 | 8/2015 | Soda et al. | | |
| 2016/0199764 A1 * | 7/2016 | Mueller | ................... | B24B 7/00 210/90 |
| 2016/0298042 A1 | 10/2016 | Yamamoto et al. | | |

FOREIGN PATENT DOCUMENTS

| | | |
|---|---|---|
| CN | 203417547 U | 2/2014 |
| CN | 204219946 U | 3/2015 |
| CN | 104661728 A | 5/2015 |
| CN | 204745914 U | 11/2015 |
| JP | 3-288509 A | 12/1991 |
| JP | 2001-323286 A | 11/2001 |
| JP | 2004-57840 A | 2/2004 |
| JP | 2012-126571 A | 7/2012 |
| JP | 2014-69927 A | 4/2014 |
| JP | 2014-180619 A | 9/2014 |
| JP | 2015-120806 A | 7/2015 |

OTHER PUBLICATIONS

Written Opinion dated Jan. 10, 2017, issued in counterpart application No. PCT/JP2016/086942, with English Translation. (14 pages).

Office Action dated Nov. 29, 2019, issued in counterpart CN application No. 201680074114.8, with English translation. (21 pages).

\* cited by examiner

FILTER BACKWASHING UNIT, CHAR RECOVERY UNIT, METHOD OF FILTER BACKWASHING, AND INTEGRATED GASIFICATION COMBINED CYCLE

FIELD

The present invention relates to a filter backwashing unit that backwashes a filter element of a filter device, a char recovery unit including the filter backwashing unit, a method of filter backwashing, and an integrated gasification combined cycle.

BACKGROUND

As a device for removing dust included in process gas flowing in a pipe, such a filter device is used that has a filter element (hereinafter referred to as an element) in a path in which process gas flows and removes dust included in a process gas passing through the element by filtering the dust. Examples of a plant equipped with a filter device using a porous filter include a plant equipped with a gasification unit.

Moreover, a carbonaceous fuel gasification unit (a coal gasification unit) that produces combustible gas by feeding carbonaceous feedstock into a gasifier and partially combusting the fuel is one of known gasification units for gasifying carbonaceous feedstock such as coal. Combustible gas produced in the gasifier of the gasification unit includes char derived from unburnt fuel and ash (hereinafter referred to as char) of carbonaceous feedstock such as coal. As a construction to separate char included in combustible gas produced by the gasification unit, the gasification unit includes a precipitator for recovering char using an element as a porous filter in the downstream side, a char storage device for storing therein char trapped by the precipitator, and a char recovery unit including a path for returning the char stored in the char storage device to the gasifier.

Continuous use of this kind of filter device, however, causes deposition of dust (substances) trapped by the element as a porous filter, which problematically increases pressure drop of the filter device and decreases the performance. A filter backwashing unit can recover the performance of the filter device by injecting gas in a direction opposite to a direction in which a process gas passes the element and removing dust adhering to and deposited on the element. Patent Literature 1 describes a filter backwashing unit that controls the backwash pressure based on the degree of dirt accumulation on the element.

CITATION LIST

Patent Literature

Patent Literature 1: Japanese Patent Application Laid-open No. 2004-57840

SUMMARY

Technical Problem

The filter backwashing unit described in Patent Literature 1 changes the backwash pressure based on a dirt coefficient (a factor affecting the differential pressure between the upstream side and the downstream side of the element). Because the dirt coefficient is a value variable depending on a factor other than the dirt of the filter, for example, on the viscosity of process gas, the degree of dust deposition does not always coordinate with the dirt coefficient. The backwash pressure suitable for the degree of dust deposition is thus not always obtained, which causes dust adhering to the element not to be sufficiently removed or a large amount of dust to adhere to the element.

The filter backwashing unit can sustain the performance of the element by increasing the frequency of backwash and removing dust before a large amount of dust adheres to the element. Higher frequency of backwash, however, increases the load on the parts such as a valve controlling gas supply of the filter backwashing unit, which may lead to early degradation of the parts. Moreover, the filter backwashing unit includes a number of elements, and a larger amount of backwashing gas such as nitrogen is therefore necessary with an increase in the frequency of backwash. On the other hand, lower frequency of backwash increases the amount of dust deposition on the elements and increases the thickness of dust deposition. The space between the elements is accordingly filled with dust, and dust included in process gas may be less likely to be removed.

To overcome the above-described problems, the present invention aims to provide a filter backwashing unit, a char recovery unit including the filter backwashing unit, and a method of filter backwashing that are capable of timing recovery of performance of a filter trapping dust and capable of preventing degradation of the backwashing device and controlling an increase in the consumption of backwashing gas necessary for backwashing by controlling an increase in the number of backwashes.

Solution to Problem

To solve the problems described above, a filter backwashing unit is disposed in a path in which process gas flows to remove at least a part of trapped dust included in a process gas by backwashing an element of a filter device that traps the dust when a process gas passes. The filter backwashing unit includes a gas injection device disposed on a downstream side of the element in a flow direction of a process gas to inject backwashing gas toward the element from the downstream side; a parameter detection device configured to detect a parameter used for determination of a state of dust adhering to the element; and a control device configured to estimate a thickness of dust deposited on a surface of the element on an upstream side of a process gas based on a result of detection obtained by the parameter detection device, and determine an interval at which the element is backwashed based on the estimated thickness of the dust.

A filter backwashing unit measures a parameter, estimates the thickness of dust deposition on an element, and determines an interval based on the estimation. This process allows the filter backwashing unit to determine the interval based on the thickness of dust deposition on the element estimated based on the parameter measured during operation. This manner allows to set a longer interval suitable for the state of the element, which varies depending on the state of operation, based on the current state of operation. This construction allows to time recovery of performance of the filter trapping dust and to control an increase in the number of backwashes with the set longer interval. An increase in the consumption of backwashing gas such as nitrogen gas can be therefore controlled by setting an appropriate backwash interval and managing the interval. Moreover, this construction allows a reduction in the number of operations of a valve per unit time and prevents degradation of the device.

The parameter detection device preferably includes a deposition amount detection device configured to detect an amount of dust deposited in a lock hopper temporarily storing therein dust exhausted from the filter device. The control device preferably estimates the thickness of the dust based on a timing when the gas injection device injects the backwashing gas and based on a change in the amount of deposition detected by the deposition amount detection device.

The thickness of dust adhering to the element is estimated based on the amount of dust deposition in a lock hopper. In this manner, the thickness of dust can be estimated based on the actual amount of dust removed by backwashing. This process allows more accurate estimation on the amount of dust.

The parameter detection device preferably includes a differential pressure detector configured to detect a difference in pressure between upstream and downstream of the element of the filter device in the flow direction of a process gas. The control device preferably estimates the thickness of the dust based on a timing when the gas injection device injects backwashing gas and based on a change in pressure detected by the differential pressure detector.

The thickness of dust adhering to the element is estimated based on the timing of backwash and a change in the differential pressure. In this manner, the thickness of dust can be estimated based on relation between a change in the differential pressure caused with dust having been removed in the backwashing process and the amount of dust. This process allows more accurate estimation on the amount of dust.

The interval is preferably a time interval. The control device preferably performs backwashing when a predetermined time interval has passed since the last backwash. Setting the interval on a time interval basis facilitates control of the interval.

To solve the problems described above, a char recovery unit includes a cyclone configured to separate combustible gas produced by a gasification unit into combustible gas and char; a filter device configured to trap char included in combustible gas passing the cyclone; any one of the filter backwashing units described above to backwash the element of the filter device; a char storage device configured to store therein char trapped by the cyclone and the filter device; a char exhaust device configured to exhaust char exhausted from the filter device to the char storage device; and a char returning line for feeding char stored in a feed hopper to the gasification unit.

The filter backwashing unit allows recovery of performance of a filter trapping dust and allows to set a longer interval of the filter backwashing unit, which can control an increase in the number of backwashes. This construction enables to sustain the state allowing combustible gas to pass through the element in an appropriate manner and to reduce energy consumed in the backwashing process. This construction allows the device to efficiently operate.

The char exhaust device preferably includes a char exhaust line connected to a lower side of the filter device in a vertical direction and is connected to the char storage device; a lock hopper disposed in the char exhaust line to temporarily store therein the char; a receiving valve disposed between the lock hopper and the filter device in the char exhaust line; and a control valve disposed between the lock hopper and the char storage device in the char exhaust line. The control device preferably closes the control valve when the receiving valve is open, and closes the receiving valve when the control valve is open. This construction allows the char exhaust device to exhaust char in a stable manner and reduces the frequency of maintenance.

To solve the problems described above, a method of filter backwashing is for backwashing an element of a filter device disposed in a path in which process gas flows and trapping dust of a gas when a process gas passes through. The method includes the steps of: detecting a parameter used for the state of dust adhering to the element; estimating the thickness of dust deposited on the element based on a result of detection of the parameter, injecting backwashing gas and determining an interval at which the element is backwashed based on the estimated thickness of the dust.

The method of filter backwashing measures a parameter, estimates the thickness of dust deposited on the element, and determines an interval based on the estimation. In this manner, the method is able to determine an interval based on the thickness of dust deposition on the element estimated based on the parameter measured during operation. This construction allows to set an interval suitable for the state of the element, which varies depending on the state of operation, based on the current state of operation. This manner allows recovery of performance of the filter trapping dust and allows to set a longer interval, which can control an increase in the number of backwashes.

An integrated gasification combined cycle includes a gasification unit configured to produce raw syngas by combusting and gasifying a carbonaceous feedstock; the char recovery unit described above to recover char from combustible gas exhausted from the gasification unit; a gas turbine configured to rotationally drive by combusting at least a part of the combustible gas produced by the gasification unit and having passed the char recovery unit; a steam turbine configured to rotationally drive using steam produced by a heat recovery steam generator inducing turbine flue gas exhausted from the gas turbine; and a generator coupled with the gas turbine and the steam turbine.

Advantageous Effects of Invention

According to the present invention, recovery of performance of a filter trapping dust can be timed, and an increase in the number of backwashes can be controlled. This construction can therefore prevent degradation of the backwashing device and control an increase in the consumption of backwashing gas necessary for backwashing.

DESCRIPTION OF EMBODIMENTS

An embodiment according to the present invention will now be described in detail with reference to the drawings. It should be noted that the embodiment is not intended to limit the present invention. Components described in the embodiment include what are replaceable by the skilled person or substantially the same. Moreover, components in the following description can be combined with one another as appropriate. In the case of a plurality of embodiments, the embodiments can be combined with one another.

Figure 1:
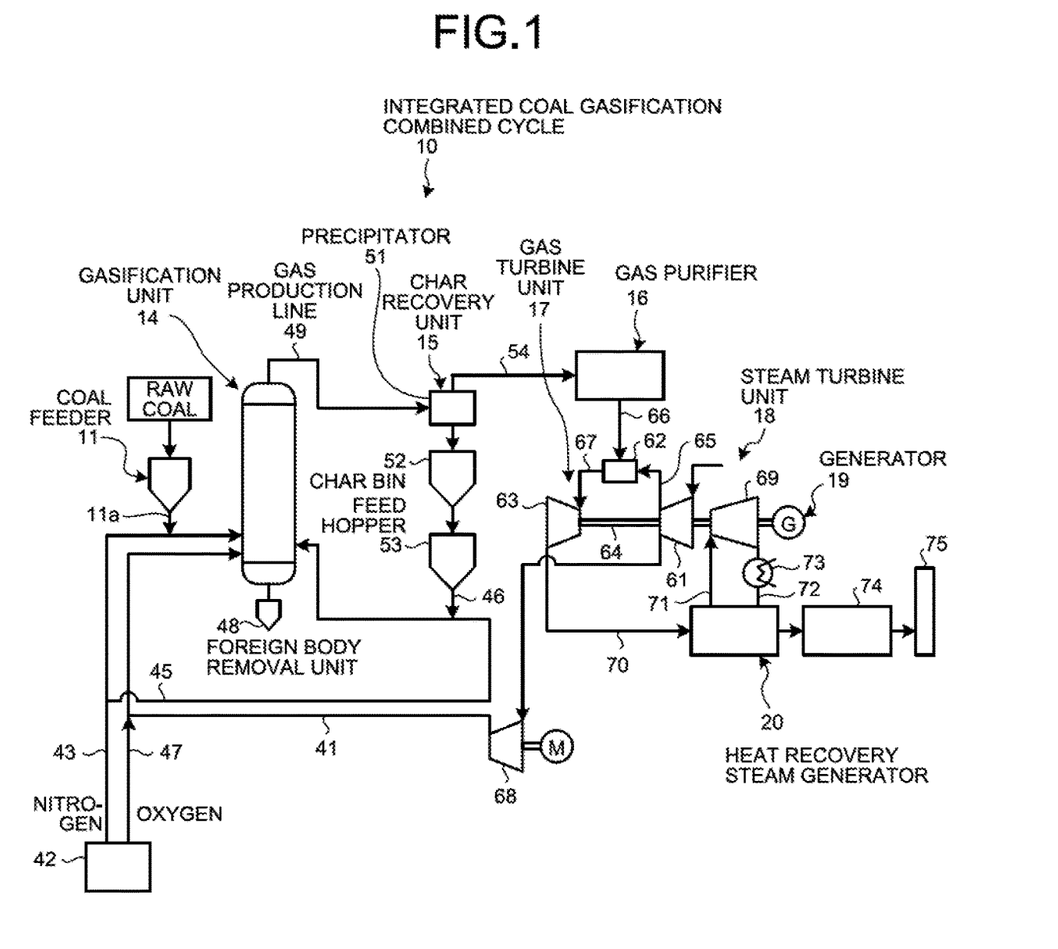
FIG. 1 is a schematic drawing of a construction of an integrated coal gasification combined cycle to which a char recovery unit according to an embodiment is applied.

FIG. 1 is a schematic drawing of a construction of an integrated coal gasification combined cycle (integrated gasification combined cycle) to which a char recovery unit according to an embodiment is applied. An integrated coal gasification combined cycle (IGCC) 10 to which a gasification unit 14 according to the embodiment is applied uses air as oxygen containing gas and employs air combustion system that produces combustible gas from fuel for the gasification unit 14. The IGCC 10 makes fuel gas by purifying the combustible gas produced by the gasification unit 14 with a gas purifier 16 and feeds the fuel gas to a gas turbine unit 17 and generates electricity. The IGCC 10 in this embodiment is a power station employing an air combustion system (air-blown gasification). For example, a carbonaceous feedstock such as coal is used as a fuel supplied to the gasification unit 14.

As illustrated in FIG. 1, the IGCC (integrated gasification combined cycle) 10 includes a coal feeder 11, the gasification unit 14, the char recovery unit 15, the gas purifier 16, the gas turbine unit 17, a steam turbine unit 18, a generator 19, and a heat recovery steam generator (HRSG) 20.

A carbonaceous feedstock is fed into the coal feeder 11 as raw coal. The coal feeder 11 mills the coal with a coal mill (not illustrated) or the like to produce coal fines in which the coal is crushed into fine particles. The coal fines produced by the coal feeder 11 are fed toward the gasification unit 14 by nitrogen serving as inert gas for transportation fed from a later-described air separation unit 42. Inert gas, examples of which include nitrogen gas, carbon dioxide gas, and argon gas, has an oxygen content of approximately smaller than five percent by volume; however, the oxygen content is not limited to approximately smaller than five percent.

The gasification unit 14 has, for example, a two-stage entrained bed gasifier. The gasification unit 14 gasifies coal (coal fines) fed thereinto by partially combusting by an oxygen containing gas (air, oxygen) and produces raw syngas. The gasification unit 14 is equipped with a foreign body removal unit 48 for removing dust mixed in the coal fines. The gasification unit 14 may be a fluid bed gasifier or a fixed bed gasifier other than the entrained bed gasifier. The gasification unit 14 is connected with a gas production line 49 for feeding combustible gas toward the char recovery unit 15 and is capable of exhausting combustible gas including char. In another construction, combustible gas may be cooled to a certain temperature by a gas cooler provided to the gas production line 49 and fed to the char recovery unit 15.

The gasification unit 14 is connected with a compressed air feeding line 41 extending from the gas turbine unit 17 (a compressor 61), and compressed air compressed by the gas turbine unit 17 is fed to the gasification unit 14. An air separation unit 42 produces nitrogen and oxygen by separating nitrogen and oxygen from air in the atmosphere and is connected with the gasification unit 14 through a first nitrogen feeding line 43. The first nitrogen feeding line 43 is connected with a coal feeding line 11a extending from the coal feeder 11. A second nitrogen feeding line 45 branched from the first nitrogen feeding line 43 is connected to the gasification unit 14 and is further connected with a char returning line 46 from the char recovery unit 15. Furthermore, the air separation unit 42 is connected with the compressed air feeding line 41 through an oxygen feeding line 47. Nitrogen separated by the air separation unit 42 flows in the first nitrogen feeding line 43 and the second nitrogen feeding line 45 and is used as transportation gas for coal and char. Oxygen separated by the air separation unit 42 flows in the oxygen feeding line 47 and the compressed air feeding line 41 and is used as oxygen containing gas by the gasification unit 14.

The char recovery unit 15 includes the char returning line 46, a precipitator 51, a char bin (a char storage device) 52, and a feed hopper 53. The precipitator 51 separates char included in combustible gas produced by the gasification unit 14. The combustible gas with char separated therefrom is sent to the gas purifier 16 through a gas exhaust line 54. The char bin 52 stores therein char separated from combustible gas by the precipitator 51. The char bin 52 sends the stored char to the feed hopper 53. The feed hopper 53 stores therein char sent from the char bin. The feed hopper 53 is connected with the char returning line 46. The char returning line 46 is connected with the second nitrogen feeding line 45. The char recovery unit 15 will be described later.

The gas purifier 16 purifies gas by removing impurities such as sulfur compounds and nitrogen compounds from the combustible gas from which char has been removed by the char recovery unit 15. The gas purifier 16 produces fuel gas by purifying the combustible gas and feeds the fuel gas to the gas turbine unit 17. The sulfur content (such as $H_2S$) still remains in the combustible gas with char separated therefrom. The gas purifier 16 removes the sulfur content using amine absorbent and eventually recycles the sulfur content as gypsum for efficient use of the sulfur content.

The gas turbine unit 17 includes the compressor 61, a combustor 62, and a turbine 63. The compressor 61 and the turbine 63 are coupled by a rotary shaft 64. The combustor 62 is connected with a compressed air feeding line 65 extending from the compressor 61, a fuel gas feeding line 66 extending from the gas purifier 16, and a combustible gas feeding line 67 extending toward the turbine 63. The gas turbine unit 17 is provided with the compressed air feeding line 41 extending from the compressor 61 to the gasification unit 14, and a booster 68 is disposed in the middle of the compressed air feeding line 41. The combustor 62 produces combustible gas by mixing compressed air fed from the compressor 61 with fuel gas fed from the gas purifier 16 and combusting the mixed gas and sends the produced combustible gas toward the turbine 63. The turbine 63 rotationally drives the rotary shaft 64 using the fed combustible gas and accordingly rotationally drives the generator 19.

The steam turbine unit 18 has a turbine 69 coupled to the rotary shaft 64 of the gas turbine unit 17, and the generator 19 is coupled to a base end of the rotary shaft 64. The HRSG 20 is connected with a flue gas line 70 extending from the gas turbine unit 17 (the turbine 63) and produces steam by exchanging heat between feed-water and high-temperature flue gas. The HRSG 20 is provided with a steam feeding line 71 and a steam recovery line 72 between the HRSG 20 and the turbine 69 of the steam turbine unit 18. The steam recovery line 72 is provided with a condenser 73. Steam produced through heat exchange with raw syngas by a heat exchanger of the gasification unit 14 may further undergo heat exchange by the HRSG 20. In the steam turbine unit 18, the turbine 69 rotationally drives using the steam fed from the HRSG 20 and rotates a rotary shaft 64, thereby rotationally driving the generator 19.

A gas cleanup device 74 removes toxic substances from flue gas the heat of which has been recovered by the HRSG 20. The clean flue gas is discharged from a stack 75 to the atmosphere.

Operation of the IGCC 10 of this embodiment will now be described.

In the IGCC 10 of this embodiment, when raw coal (coal) is fed to the coal feeder 11, the coal feeder 11 makes coal fines by milling the coal into fine particles. The coal fines made by the coal feeder 11 flow in the first nitrogen feeding line 43 by using nitrogen fed from the air separation unit 42 and are fed to the gasification unit 14. Furthermore, char recovered by the later-described char recovery unit 15 flows in the second nitrogen feeding line 45 by using nitrogen fed from the air separation unit 42 and is fed to the gasification unit 14. Compressed air bled from the later-described gas turbine unit 17 is boosted by the booster 68 and is fed to the gasification unit 14 through the compressed air feeding line 41 along with oxygen fed from the air separation unit 42.

The gasification unit 14 produces combustible gas (raw syngas) by combusting the fed coal fines and char with the compressed air (oxygen) and gasifying the coal fines and the char. The combustible gas is exhausted from the gasification unit 14 through the gas production line 49 and sent to the char recovery unit 15.

In the char recovery unit 15, the combustible gas is fed to the precipitator 51, and particulate char included in the combustible gas is separated. The combustible gas with char separated therefrom is sent to the gas purifier 16 through the gas exhaust line 54. The particulate char separated from the combustible gas is exhausted to the char bin (char storage device) 52 and deposited in the feed hopper 53 from the char bin 52. The particulate char is further returned to the gasification unit 14 through the char returning line 46 and recycled.

The gas purifier 16 purifies the combustible gas, from which char has been separated by the char recovery unit 15, by removing impurities such as sulfur compounds and nitrogen compounds and produces fuel gas. In the gas turbine unit 17, the compressor 61 produces compressed air and feeds the air to the combustor 62. The combustor 62 mixes the compressed air fed from the compressor 61 with fuel gas fed from the gas purifier 16 and combusts the mixed gas to produce combustible gas. The turbine 63 rotationally drives using the combustible gas, which accordingly rotationally drives the generator 19 through the rotary shaft 64 and has the generator 19 generate electricity.

The HRSG 20 produces steam from exhaust gas exhausted from the turbine 63 of the gas turbine unit 17 by exchanging heat with feed-water and feeds the produced steam to the steam turbine unit 18. In the steam turbine unit 18, the turbine 69 rotationally drives using the steam fed from the HRSG 20, which accordingly rotationally drives the generator 19 through the rotary shaft 64 and has the generator 19 generate electricity.

The gas cleanup device 74 removes toxic substances from exhaust gas exhausted from the HRSG 20 and discharges the clean flue gas to the atmosphere through the stack 75.

Figure 2:
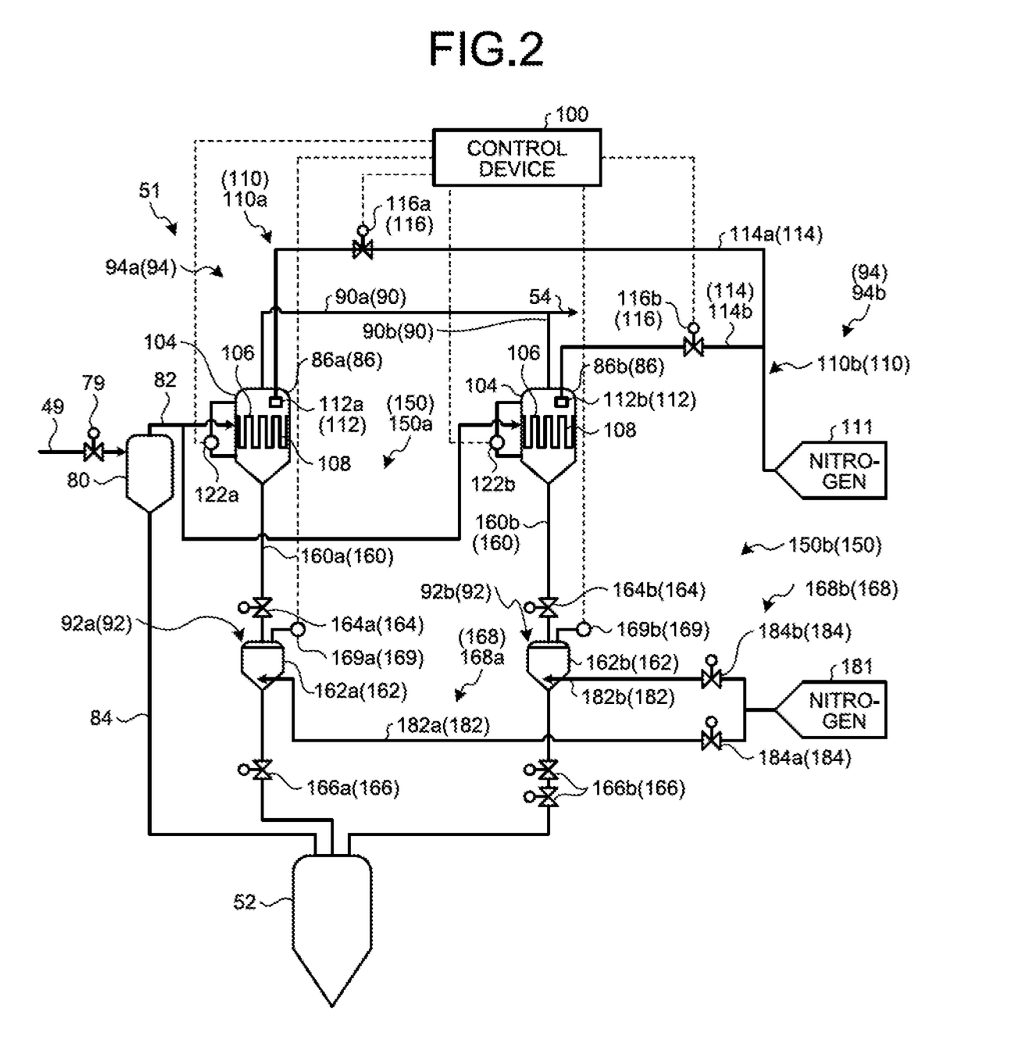
FIG. 2 is a schematic drawing of a construction of the char recovery unit including a filter backwashing unit according to the embodiment.
Figure 3:
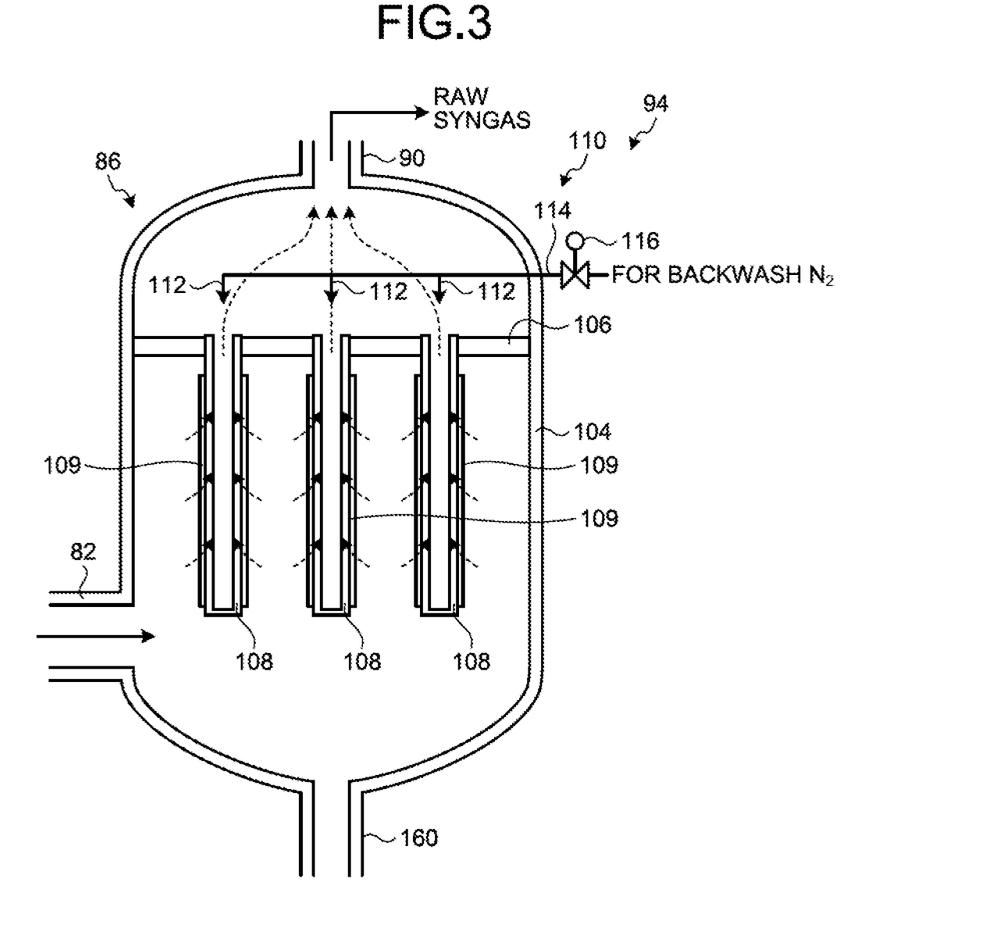
FIG. 3 is a sectional drawing that illustrates a schematic construction of a filter device.

The char recovery unit 15 will now be described in detail with reference to FIGS. 1, 2, and 3. FIG. 2 is a schematic drawing of a construction of a char recovery unit including a filter backwashing unit according to the embodiment. FIG. 3 is a sectional drawing that illustrates a schematic construction of a filter device.

As described above, the char recovery unit 15 includes the precipitator 51, the char bin 52, the feed hopper 53, and the char returning line 46. The char bin 52 is a container storing therein char exhausted (fed) from the precipitator 51. The feed hopper 53 is a container storing therein char fed from the char bin 52. The feed hopper 53 feeds the stored char to the gasification unit 14 through the char returning line 46. One feed hopper 53 is disposed in this embodiment; however, a plurality of feed hoppers 53 may be disposed. In this case, char temporarily stored in the char bin 52 may be fed to the feed hoppers 53.

The precipitator 51 will now be described. The precipitator 51 is connected with the gas production line 49. The precipitator 51 receives raw syngas produced by the gasification unit 14 through the gas production line 49. The gas production line 49 is provided with a control valve 79. The control valve 79 controls feed of combustible gas from the gasification unit 14 to the precipitator 51. The precipitator 51 includes a cyclone 80, two filter devices 86*a* and 86*b*, char exhaust devices 92*a* and 92*b*, and filter backwashing units 94*a* and 94*b*. The char recovery unit 15 has the components connected with one another through lines in which combustible gas or char flows. The char recovery unit 15 includes combustible gas lines 82, 90*a*, and 90*b* and a char recovery line 84 as the lines. The char exhaust device 92*a* connects the filter device 86*a* with the char bin 52. The char exhaust device 92*b* connects the filter device 86*b* with the char bin 52.

The cyclone 80 is a primary precipitator connected with the gas production line 49 and separating char from combustible gas fed from the gas production line 49. The cyclone 80 can use various kinds of devices that separate char by using a flow of combustible gas. For example, the cyclone 80 separates char included in the combustible gas by centrifugation. The combustible gas line 82 connects the cyclone 80 with two filter devices 86*a* and 86*b*. The char recovery line 84 connects the cyclone 80 with the char bin 52. Combustible gas with char separated therefrom is fed to the combustible gas line 82, and char separated from the combustible gas is fed to the char recovery line 84.

The filter devices 86*a* and 86*b* are secondary precipitators connected with the combustible gas line 82 and further separating char from combustible gas, from which char has been primarily separated by the cyclone 80, fed from the combustible gas line 82. The precipitator 51 roughly collects char with the cyclone 80 and carefully collects char with the filter devices 86*a* and 86*b*. The filter device 86*a* is connected with the combustible gas line 82, the char exhaust device 92*a*, and the combustible gas line 90*a*. The char exhaust device 92*a* connects the filter device 86*a* with the char bin 52. The combustible gas line 90*a* connects the filter device 86*a* with the gas exhaust line 54. The filter device 86*b* is connected with the combustible gas line 82, the char exhaust device 92*b*, and the combustible gas line 90*b*. The char exhaust device 92*b* connects the filter device 86*b* with the char bin 52. The combustible gas line 90*b* connects the filter device 86*b* with the gas exhaust line 54. The filter devices 86*a* and 86*b* are substantially the same except that they are placed in different locations and thus will be referred to as a filter device 86 when collectively described. Likewise, the char exhaust devices 92*a* and 92*b* are substantially the same except that they are placed in different locations and thus will be referred to as a char exhaust device 92 when collectively described. The parts connected to the filter device 86 and the char exhaust device 92 will also be referred to in the same manner unless otherwise separately described.

The filter device 86 uses porous filter elements and includes a container 104, a partition board 106, and a number of elements 108 as illustrated in FIG. 3. Components other than lines for feeding and exhausting char and combustible gas are sealed in the container 104. The container 104 is connected with the combustible gas line 82, a char exhaust line 160, and a combustible gas line 90. The partition board 106 is disposed in the container 104 and divides the container 104 into two spaces. The partition board 106 of this embodiment divides the space in the container 104 into an upper area in the vertical direction and a lower area in the vertical direction. The container 104 is connected with the combustible gas line 82 and the char exhaust device 92 in the lower area with respect to the partition board in the vertical direction. The container 104 is connected with the combustible gas line 90 in the upper area with respect to the partition board 106 in the vertical direction. A plurality of circular holes are formed on the partition board 106. The elements 108 are arranged in the respective circular holes on the partition board 106. The element 108 is a hollow cylinder (for example, a circular cylinder) and has a bottom that closes an end in the side distant from the partition board 106 of the cylinder. The element 108 of this embodiment has its upper end portion in the vertical direction supported by the partition board 106 and is arranged in a manner projecting downward from the partition board 106 in the vertical direction. The element 108 closes the circular hole of the partition board 106. Air therefore passes through the element 108 for entering the upper area with respect to the partition board 106 of the container 104 in the vertical direction from the lower area with respect to the partition board 106 of the container 104 in the vertical direction. The element 108 is a member passing combustible gas and trapping dust such as char included in the combustible gas.

In the filter device 86, combustible gas fed from the combustible gas line 82 passes through the element 108 and is exhausted to the combustible gas line 90. The element 108 traps dust (substances and powder dust) such as char included in the passing combustible gas. The element 108 traps dust 109 on its surface in the upstream side in a flow direction of the combustible gas, that is, a surface in the side connecting with the combustible gas line 82 and has the dust 109 deposited thereon. The filter device 86 detaches the dust 109 trapped and deposited on the element 108 from the element 108 using the later-described filter backwashing units 94a and 94b and exhausts the dust 109 to the char exhaust device 92. In this embodiment, the filter device 86 has two systems; however, the filter device 86 may employ three or more systems.

The char exhaust device 92a includes the char exhaust line 160a, a lock hopper 162a, a receiving valve 164a, a control valve 166a, a nitrogen feeding device 168a, and a deposition amount detection device 169a. The nitrogen feeding device 168a includes a nitrogen feeding line 182a and a control valve 184a. Likewise, the char exhaust device 92b includes the char exhaust line 160b, a lock hopper 162b, a receiving valve 164b, a control valve 166b, a nitrogen feeding device 168b, and a deposition amount detection device 169b. The nitrogen feeding device 168b includes a nitrogen feeding line 182b and a control valve 184b. The char exhaust devices 92a and 92b will be collectively referred to as the char exhaust device 92.

The char exhaust device 92a exhausts char in the filter device 86 to the char bin 52. Because the char bin 52 has a higher pressure than that of the filter device 86, the char exhaust device 92a needs to send out char in the adverse pressure circumstance. The cyclone 80 is directly coupled to the char bin 52 through the char recovery line 84. Because of this construction, a countermeasure against backflow of char in the exit side of the cyclone 80 to the filter device 86 through the char recovery line 84 and the char exhaust line 160a is necessary for the char exhaust device 92a.

The char exhaust line 160 has an end connected with the filter device 86 and has the other end connected with the char bin 52. The char exhaust line 160 is provided with a lock hopper 162, a receiving valve 164, and a control valve 166. The lock hopper 162 is provided to the char exhaust line 160. The lock hopper 162 temporarily stores therein char exhausted from the filter device 86 and exhausts the stored char to the char bin 52. The lock hopper 162 is a container having an inner space for depositing and storing char. The lock hopper 162 has a connection portion for connection with the char exhaust line 160 connected with the char bin 52, at its lower end portion in the vertical direction. More specifically, the lock hopper 162 is located higher with respect to the char bin 52 in the vertical direction. A connection portion connecting between the lock hopper 162 and the char bin 52 of the char exhaust line 160 is arranged toward a direction in which char falls due to the gravity from the lock hopper 162 to the char bin 52. The lock hopper 162 exhausts char through the connection portion for connection with the char exhaust line 160 formed in the lower side in the vertical direction.

The receiving valve 164 is disposed between the filter device 86 and the lock hopper 162 in the char exhaust line 160. The receiving valve 164 determines whether to feed or stop feeding char exhausted from the filter device 86 and flowing into the char exhaust line 160 to the lock hopper 162 by switching between opening and closing.

The control valve 166 is disposed between the lock hopper 162 and the char bin 52 in the char exhaust line 160. The control valve 166 determines whether to feed or stop feeding char exhausted from the lock hopper 162 and flowing into the char exhaust line 160 to the char bin 52 by switching between opening and closing.

The nitrogen feeding device 168 feeds nitrogen to the lock hopper 162. The nitrogen feeding device 168 includes a nitrogen feed source 181, a nitrogen feeding line 182, and a control valve 184. The nitrogen feed source 181 feeds nitrogen. Any inert gas not affecting combustible gas or char may be used instead of nitrogen of this embodiment. The nitrogen feeding line 182 has an end connected with the nitrogen feed source 181 and has the other end connected with the lock hopper 162. The nitrogen feeding line 182 in this embodiment is disposed near an exhaust port of the lock hopper 162 for exhausting char stored in the lock hopper 162. An injection port for injecting nitrogen from the nitrogen feeding line 182 into the lock hopper 162 is arranged at an angle allowing nitrogen to be injected toward the exhaust port. The control valve 184 adjusts opening and closing and controls start and stop of feeding nitrogen from the nitrogen feed source 181 to the lock hopper 162.

The nitrogen feeding device 168 supplies nitrogen from the nitrogen feed source 181 to the lock hopper 162 through the nitrogen feeding line 182 and injects nitrogen into the lock hopper 162. Nitrogen injected into the lock hopper 162 is sprayed to char deposited in the lock hopper 162. The nitrogen feeding device 168 sprays nitrogen to char deposited in the lock hopper 162, thereby breaking down the char deposited in the lock hopper 162 and consequently promoting exhaust of the char in the lock hopper 162 to the char bin 52.

The nitrogen feeding device 168 increases the pressure inside the lock hopper 162 by feeding nitrogen with both the receiving valve 164 and the control valve 166 closed. The pressure of the lock hopper 162 accordingly balances the pressure of the filter device 86, which renders char receivable from the filter device 86 to the lock hopper 162.

The deposition amount detection device 169 detects the amount of char deposition in the lock hopper 162. A gamma-ray detector, a load cell, and other devices can be used as the deposition amount detection device 169. The deposition amount detection device 169 sends results of detection to a control device 100.

The char exhaust device 92 detects the amount of char stored in the lock hopper 162 based on a result of detection obtained by the deposition amount detection device 169 and controls the receiving valve 164 and the control valve 166 to open or close based on the result of detection. This process allows the char exhaust device 92 to switch between the state of feeding char in the filter device 86 to the lock hopper 162 and the state of feeding (exhausting) char stored in the lock hopper 162 to the char bin 52, whereby the char exhaust device 92 feeds char in the filter device 86 to the char bin 52 through the lock hopper 162.

Specifically, with the receiving valve 164 open and the control valve 166 closed, the char exhaust device 92 closes the part between the lock hopper 162 and the char bin 52 and opens the part between the lock hopper 162 and the filter device 86. This process allows char to be fed from the filter device 86 to the lock hopper 162 with a flow of char shut between the lock hopper 162 and the char bin 52. In this manner, the char fed from the filter device 86 is deposited and stored in the lock hopper 162. The char exhaust device 92 closes the receiving valve 164 upon determination that the amount of char deposition in the lock hopper 162 exceeds a certain set value based on a result of detection obtained by the deposition amount detection device 169. With this process, both the receiving valve 164 and the control valve 166 are closed. When both the receiving valve 164 and the control valve 166 are closed, the char exhaust device 92 feeds nitrogen from the nitrogen feeding device 168 to the lock hopper 162 and pressurizes the lock hopper 162 so that the pressure in the lock hopper 162 will be the same as the pressure in the char bin 52. The char exhaust device 92 opens the control valve 166 with the receiving valve 164 closed, thereby closing the part between the lock hopper 162 and the filter device 86 with the part between the lock hopper 162 and the char bin 52 open. This process enables char to be fed from the lock hopper 162 to the char bin 52 and to shut a flow of char between the lock hopper 162 and the filter device 86.

In this manner, the char exhaust device 92 is capable of switching positions to shut the flow of char using opening and closing of valves by closing either one of the receiving valve 164 and the control valve 166 with the other one open. The char exhaust device 92 feeds nitrogen from the nitrogen feeding device 168 and adjusts the pressure in the lock hopper 162. In this manner, the char exhaust device 92 is capable of having char exhausted from the filter device 86 to the char bin 52, the pressure of which is different from each other, while preventing backflow of char from the char bin 52 to the filter device 86.

As illustrated in FIG. 2 and FIG. 3, the filter backwashing unit 94a performs backwashing processing on the element 108 of the filter device 86a and detaches the dust 109 such as char included in combustible gas and trapped and deposited on the element 108 from the element 108. The filter backwashing unit 94a includes a gas injection device 110a and a differential pressure gauge 122a (see FIG. 2). The filter backwashing unit 94b detaches the dust 109 trapped and deposited on the element 108 of the filter device 86b from the element 108 by performing backwashing processing on the element 108. The filter backwashing unit 94b includes a gas injection device 110b and a differential pressure gauge 122b (see FIG. 2).

The gas injection device 110a includes a nitrogen feed source 111 (see FIG. 2), a nozzle 112a, a nitrogen feeding line 114a, and a control valve 116a. The gas injection device 110b includes the nitrogen feed source 111 (see FIG. 2), a nozzle 112b, a nitrogen feeding line 114b, and a control valve 116b. The nitrogen feed source 111 is shared by the gas injection device 110a and the gas injection device 110b. Because the gas injection device 110a and the gas injection device 110b share the basic construction except that the respective injection devices are provided to the filter device 86a and the filter device 86b, the above-described components will be referred to as a gas injection device 110, a nozzle 112, a nitrogen feeding line 114, and a control valve 116.

The nozzle 112 is disposed in the downstream side in the flow direction of combustible gas with respect to the element 108 of the filter device 86, in other words, disposed in the side of the combustible gas line 90. The nozzle 112 is disposed in the side with an exposed surface of the element 108 opposite to the surface to which trapped and deposited dust 109 adheres. One or a plurality of nozzles 112 are provided for one filter device 86. The nitrogen feeding line 114 connects the nitrogen feed source 111 (see FIG. 2) with the nozzle 112. The control valve 116 adjusts opening and closing and controls the nitrogen feed source 111 (see FIG. 2) to start or stop feeding nitrogen to the nozzle 112.

The gas injection device 110 feeds nitrogen from the nitrogen feed source 111 (see FIG. 2) to the nozzle 112 through the nitrogen feeding line 114 and injects nitrogen from the nozzle 112 toward the element 108. Nitrogen injected from the nozzle 112 is sprayed onto the element 108. The gas injection device 110 injects nitrogen from the downstream side with respect to the element 108 in the flow direction of combustible gas toward the element 108 and removes and detaches the trapped and deposited dust 109 adhering to the element 108 in the upstream side of the flow direction of the combustible gas, from the surface of the element 108. The differential pressure gauge 122a is installed to the filter device 86a. The differential pressure gauge 122a detects a difference in the pressure between the upstream area and the downstream area with respect to the element 108 of the filter device 86a. The differential pressure gauge 122b detects a difference in the pressure between the upstream area and the downstream area with respect to the element 108 of the filter device 86b.

The char recovery unit 15 (see FIG. 1) includes the control device 100 (see FIG. 2). The control device 100 controls operation of each part of the char recovery unit 15. The control device 100 further controls the filter backwashing unit 94.

Figure 4:
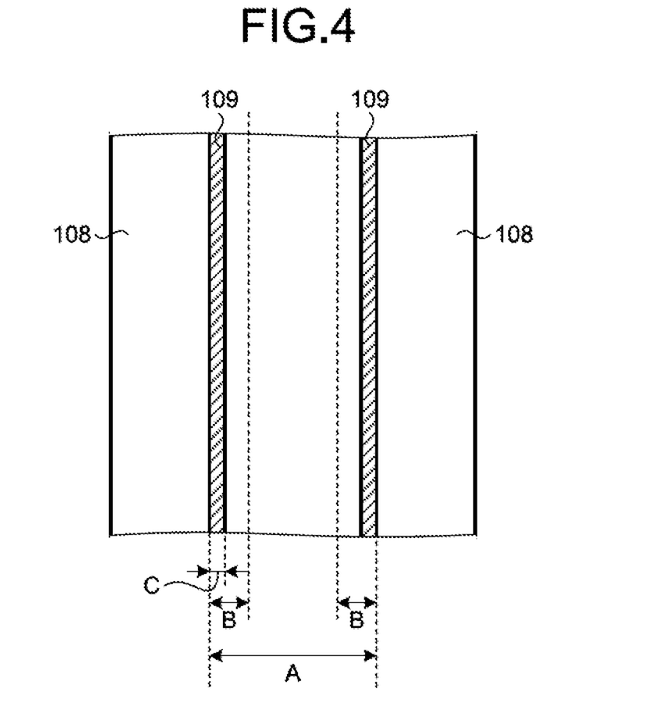
FIG. 4 is an illustrative drawing of relation between an element of the filter device and dust.
Figure 5:
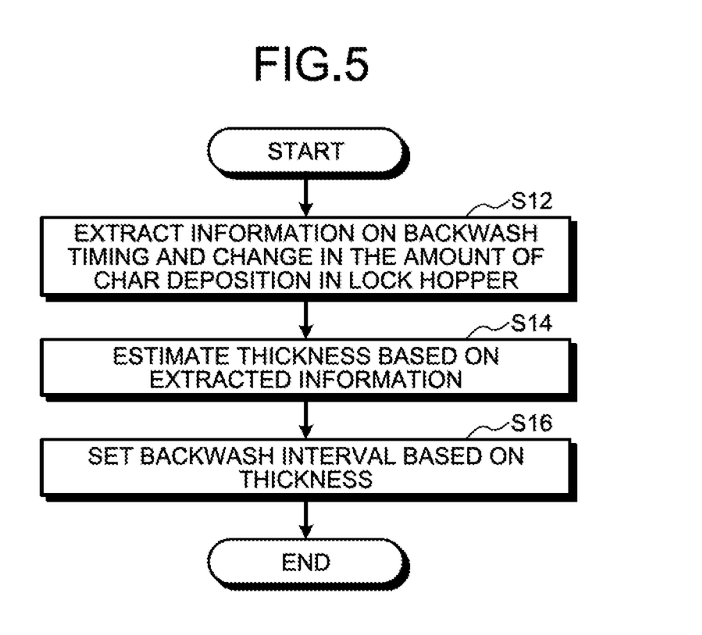
FIG. 5 is a flowchart that illustrates exemplary processing for determining a backwash interval in a method of filter backwashing.
Figure 6:
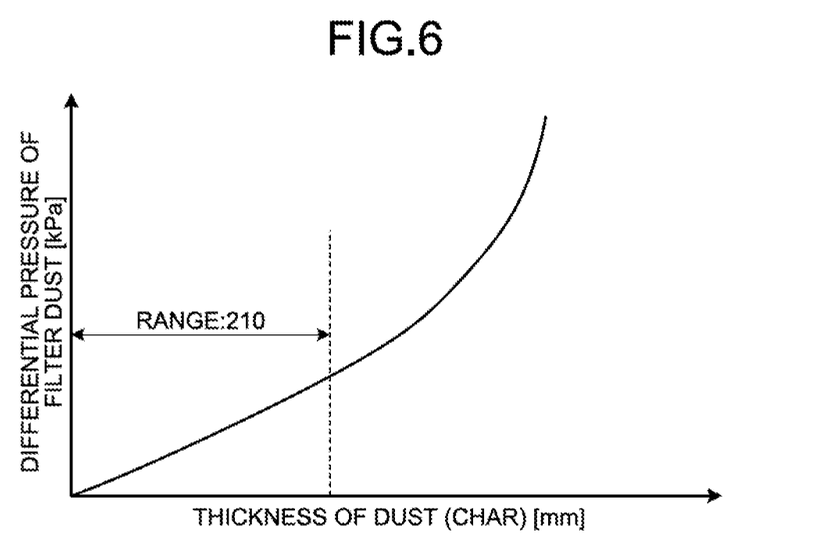
FIG. 6 is a graph that illustrates exemplary relation between a differential pressure of the filter device and the amount of dust deposition.
Figure 7:
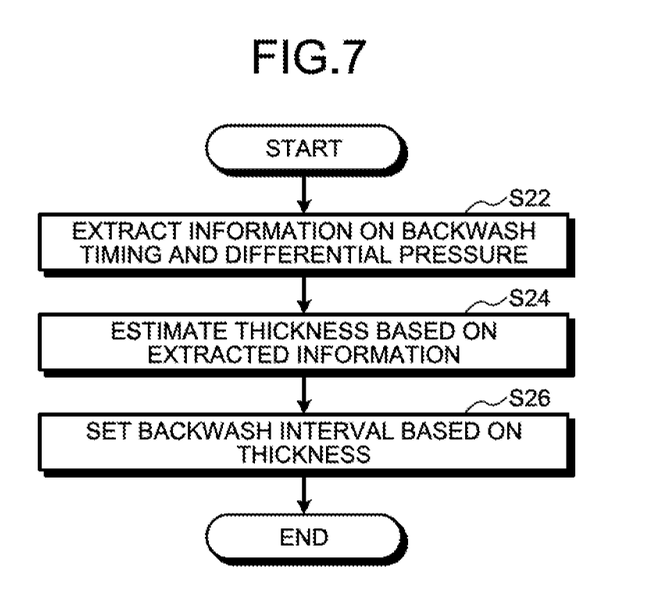
FIG. 7 is a flowchart that illustrates exemplary processing for determining a backwash interval in the method of filter backwashing.

Operation of the filter backwashing unit 94 (see FIG. 3) of the char recovery unit 15 (see FIG. 1), that is, an exemplary method of filter backwashing by the filter backwashing unit 94 will now be described with reference to FIG. 4 to FIG. 7. FIG. 4 is a drawing that illustrates relation between an element of the filter device 86 and dust adhering and deposited on the element. FIG. 5 is a flowchart that illustrates exemplary processing for determining a backwash interval in the method of filter backwashing. FIG. 6 is a graph that illustrates exemplary relation between the differential pressure of the filter device and the amount of dust adhering and deposited on the element. FIG. 7 is a flowchart that illustrates exemplary processing for determining a backwash interval in the method of filter backwashing.

As described above, the filter backwashing unit 94 injects nitrogen toward the element 108 of the filter device 86 from the gas injection device 110 and passes the nitrogen through the element 108 in a direction opposite to the flow direction of combustible gas, thereby removing the dust 109 such as char included in the combustible gas and adhering and deposited on the surface of the element 108. The filter backwashing unit 94 regularly performs backwashing at the set intervals and regularly removes the dust 109 adhering and deposited on the surface of the element 108. A time interval between backwashes and the differential pressure detected by the differential pressure gauges 122a and 122b can be used for the interval. Use of a time interval for the interval as described later allows backwashing to be performed at a certain time interval by simple control. Use of the differential pressure detected by the differential pressure gauges 122a and 122b for the interval will now be described. When the dust 109 adhering and deposited on the surface of the element 108 exceeds a certain amount, backwashing is performed based upon determination that the differential pressure detected by the differential pressure gauges 122a and 122b reaches a set threshold. In this manner, a backwash timing is determined based on the differential pressure actually obtained. Use of the differential pressure detected by the differential pressure gauges 122a and 122b for determination allows backwashing to be timed in response to a change in operation conditions.

As illustrated in FIG. 4, the distance between adjacent elements 108 is defined as a distance A, a determined limit for the dust 109 adhering and deposited on the surface of the element 108 is defined as a distance B, and the thickness of the dust 109 adhering and deposited on the surface of the element 108 is defined as a distance C. The determined limit (the distance B) is a value set so as to prevent bridging, which fills the area between the elements 108 with the dust 109, even when problems occur such as a measurement error and a control error and variance in the amount of adhering and deposited dust between elements and between portions of the element in the vertical direction. The determined limit (the distance B) is calculated as: the distance B=the distance A/(two directions×a margin). The distance B is thus smaller than a half of the distance A. The margin is set considering variance in the amount of adhering and deposited dust between elements 108 and between portions of the element in the vertical direction.

The amount of dust 109 adhering and deposited on the surface of the element 108 is determined to have exceeded a predetermined amount when the differential pressure detected by the differential pressure gauges 122a and 122b reaches a set threshold. The control device 100 estimates the distance C representing the thickness of the dust 109 adhering and deposited on the surface of the element 108 and determines a backwash interval based on the distance C and the distance B. The control device 100 estimates the distance C in a highly accurate manner based on a measurement value (such as the differential pressure detected by the differential pressure gauge 122) of a parameter used for estimation of the distance C. The control device 100 is therefore able to prevent bridging that fills the area between the elements 108 with the accumulated and deposited dust 109 while lowering the margin of the distance B.

Use of a time interval for the backwash interval allows backwashing to be performed at a certain time interval by simple control, which will now be described. As illustrated in FIG. 5, exemplary processing for setting an interval (a time interval) as the backwash interval in the method of filter backwashing will now be described. The processing illustrated in FIG. 5 is carried out with the control device 100 performing arithmetic processing based on a result of detection obtained by the deposition amount detection device 169 and information on the timing when backwashing has been performed. The control device 100 extracts information on a backwash timing and a change in the amount of char deposition in the lock hopper 162 (Step S12). The control device 100 extracts the backwash timing from information on timings of opening and closing of the control valve 116. The control device 100 further extracts information on a change in the amount of char deposition in the lock hopper 162 from a result of detection obtained by the deposition amount detection device 169.

The control device 100 further estimates the thickness of the dust 109 adhering and deposited on the element 108 based on the extracted information (Step S14). The control device 100 calculates the amount of char removed from the element 108 by backwashing and newly deposited in the lock hopper 162 based on the backwash timing and a change in the amount of char deposition in the lock hopper 162 across the backwash timing. The control device 100 may estimate the amount of char having moved to the lock hopper 162 without adhering to the element 108 based on past operational data and others. In this case, considering the amount of char having moved, the control device 100 may estimate the amount of char having moved to the lock hopper 162 without adhering to the element 108 and deduct the estimated amount from the amount of char newly deposited in the lock hopper 162. This manner allows more accurate estimation of the thickness of the dust 109 adhering to the surface of the element 108. The control device 100 divides the amount of char newly deposited in the lock hopper 162 by the surface area of the element 108 and estimates the distance C representing the thickness of the dust 109 adhering to the surface of the element 108 as: (the amount of char newly deposited in the lock hopper 162)/(the surface area of the element 108). Backwashing may be performed on some of the elements 108 in the filter device 86 in such a manner that groups the elements 108 into a plurality of blocks and performs backwashing on the block basis. In this case, the control device 100 calculates the thickness of the dust 109 based on the surface area of the elements 108 on which backwashing has been performed.

The control device 100 determines a backwash interval based on the distance C representing the estimated thickness of the dust 109 (Step S16). The control device 100 calculates a time necessary for the dust thickness C to reach the distance B representing a determined limit after backwashing, based on the current backwash interval and the estimated thickness C and sets the calculated time as a backwash interval. The control device 100 performs backwashing at the interval determined by the processing illustrated in FIG. 5. When the control device 100 performs backwashing on the filter device 86 on the block basis, a time from when a block is backwashed to when the block is again backwashed corresponds to a time necessary for the dust thickness C deposited on the element 108 to reach the distance B representing a determined limit after backwashing. An interval at which the filter backwashing unit 94 performs backwashing is calculated, for example, by dividing a time necessary for the dust thickness C deposited on the element 108 to reach the distance B representing a determined limit after backwashing by the number of blocks on which backwashing is performed.

The filter backwashing unit 94 detects the amount of char (the dust 109) deposited in the lock hopper 162 and a backwash timing and performs arithmetic operation, thereby estimating the thickness of the dust 109 deposited on the element 108. This construction allows the filter backwashing unit 94 to estimate the thickness of the dust 109 deposited on the element 108 of the filter during operation and to determine the state of the element 108 based on the actual states in operation.

The filter backwashing unit 94 is capable of estimating the thickness of the dust 109 deposited on the element 108, thereby determining a backwash interval from the distance C representing the estimated thickness of the dust and the distance B representing a determined limit. Estimation of the thickness of the dust 109 thus enables determination of whether the dust is deposited to a thickness close to the distance B as a determined limit, and the backwash interval can be appropriately set based upon the determination. Backwashing is therefore performed when the dust 109 is deposited to a thickness closer to the distance B as the determined limit, which allows a longer backwash interval to be set. A longer backwash interval can reduce the amount of consumption of nitrogen serving as backwashing gas. Furthermore, a longer backwash interval can reduce the number of drives of the control valve 116, which can prevent exhaustion of the part and increase reliability of the entire equipment. More specifically, the control valve 116 performing backwashing is a valve operating at high frequency and high speed. A longer backwash interval therefore reduces the number of operations of the valve per unit time and controls exhaustion of the part, which can improve reliability. Estimation of the thickness of the dust 109 allows the interval to be set shorter if the amount of deposition of the dust 109 exceeds the distance B as the determined limit. This construction prevents the space between the elements 108 from being filled with the dust 109, in other words, for example, prevents bridging, in which masses of dust 109 in the space between the elements 108 contact with each other, and eliminates causes that disturb removal of char included in the combustible gas. In this manner, the filter backwashing unit 94 can time recovery of performance of the filter for trapping dust and control an increase in the number of backwashes.

In the embodiment, an estimation value of the thickness of the dust 109 deposited on the element 108 is calculated, and a backwash interval is determined based on the estimation value. The backwash interval may be determined based on a change in the amount of char deposited in the lock hopper 162 in such a manner that preliminarily calculates relation between the estimation value of the amount of deposition as the thickness of the dust 109 and a change in the amount of char deposition in the lock hopper 162.

Another exemplary method of setting a backwash interval will now be described with reference to FIG. 6 and FIG. 7. In FIG. 6, the abscissa is indicative of the thickness [mm] (the amount of deposition [g/cm$^2$]) of dust (char) adhering to the element 108, whereas the ordinate is indicative of the differential pressure [kPa] of filter dust detected by the differential pressure gauges 122a and 122b. As illustrated in FIG. 6, the relation between the thickness [mm] of dust (char) adhering to the element 108 and the differential pressure [kPa] of filter dust detected by the differential pressure gauges 122a and 122b is substantially proportional in a range 210 where the thickness of dust (char) adhering to the element is comparatively small. The amount of increase in the differential pressure of filter dust to an increase in the thickness of dust (char) adhering to the element is incremented when the thickness of dust (char) exceeds the range 210. The relation between the differential pressure and the thickness of dust (char) varies depending on the operating time and other factors. In the graph of FIG. 6, numeric ranges of the ordinate and the abscissa may be shifted; however, the rate of change is substantially constant in the range 210.

Based on the relation illustrated in FIG. 6, the filter backwashing unit 94 may set the interval such that the value of a change in the differential pressure ΔP varying across a backwash lowers a limit value, thereby extending the backwash interval to an appropriate length and preventing the element 108 from being obstructed.

Exemplary processing will now be described using FIG. 7. The control device 100 extracts a backwash timing and information on the differential pressure (Step S22). The control device 100 extracts the backwash timing from information on timings of opening and closing of the control valve 116. The control device 100 extracts information on the differential pressure from a result of detection obtained by the differential pressure gauges 122a and 122b.

The control device 100 further estimates the thickness of the dust 109 adhering to the element 108 based on the extracted information (Step S24). More specifically, the control device 100 estimates the thickness of the dust 109 based on the amount of change ΔP in the differential pressure obtained by the differential pressure gauges 122a and 122b across a backwash and based on the relation illustrated in FIG. 6. The thickness of the dust 109 before the backwash is calculated by applying the amount of change ΔP in the differential pressure to the relation in the range 210 of FIG. 6 and calculating a change in the thickness of the dust (char) adhering to the element 108 resulting from the backwash.

The control device 100 determines the backwash interval based on the estimated thickness (Step S26). The control device 100 calculates a time necessary for the dust thickness C to reach the distance B representing a determined limit after backwashing, based on the current backwash interval and the estimated thickness C and sets the calculated time as the backwash interval. The control device 100 performs backwashing at the interval determined by the processing illustrated in FIG. 5.

As described above, the filter backwashing unit 94 estimates the thickness of dust deposited on the element 108 based on a result of measurement obtained by the differential pressure gauges 122a and 122b. In this manner, the filter backwashing unit 94 can appropriately set a longer backwash interval while preventing obstruction of the element. Furthermore, the filter backwashing unit 94 calculates the thickness of the dust 109 (the amount of deposition on the element 108) having been removed by a backwash from the amount of change in the differential pressure across the backwash based on a result of measurement obtained by the differential pressure gauges 122a and 122b and the backwash timing. With this construction, the filter backwashing unit 94 can calculate the thickness of the dust 109 even if performance of the element 108 is changed after the measurement. Use of a change in the pressure across the backwash in the range 210 as the range of use of the element 109 enables highly accurate estimation of the thickness of the dust 109 even when the relation of FIG. 6 is changed.

In the above-described embodiment, an estimation value of the thickness is calculated, and a backwash interval is determined based on the estimation value. In another manner, the backwash interval may be determined, without calculating the thickness of the dust in actual processing, by setting ΔP, a value of a change in the differential pressure calculated from a result of detection by the differential pressure gauges 122a and 122b, as a threshold of variance.

When a backwash interval is set using the processing in FIG. 7, the char recovery unit 15 may use a char exhaust line with a rotary valve instead of using a char exhaust device with a lock hopper.

In the above-described embodiment, the amount of deposition of char (dust) in the lock hopper 162 measured by the amount of deposition measurement device 169 or a difference in the pressure (the differential pressure) between the elements 108 measured by the differential pressure gauges 122a and 122b is used as a parameter for estimating the thickness of the dust 109 deposited on the element 108; however, the embodiment is not limited thereto. Various parameters are applicable for estimation of the thickness of the dust 109 deposited on the element 108.

In the above-described embodiment, the filter backwashing unit 94 is described as a device for the filter device 86 of the char recovery unit 15 in the IGCC 10. Instead, the filter backwashing unit 94 may be used for a filter device used in a plant other than the IGCC 10, for example, a chemical plant. Dust trapped by the filter device is not limited to char, and the device is applicable for various kinds of foreign bodies included in process gas.

REFERENCE SIGNS LIST 10 integrated coal gasification combined cycle (integrated gasification combined cycle) (IGCC)
11 coal feeder
11a coal feeding line
14 gasification unit
15 char recovery unit
16 gas purifier
17 gas turbine unit
18 steam turbine unit
19 generator
20 heat recovery steam generator (HRSG)
41 compressed air feeding line
42 air separation unit
43 first nitrogen feeding line
45 second nitrogen feeding line
46 char returning line
47 oxygen feeding line
49 gas production line
51 precipitator
52 char bin
53 feed hopper
54 gas exhaust line
61 compressor
62 combustor
63 turbine
64 rotary shaft
65 compressed air feeding line
66 fuel gas feeding line
67 combustible gas feeding line
68 booster
69 turbine
70 flue gas line
71 steam feeding line
72 steam recovery line
74 gas cleanup device
75 stack
79 control valve
80 cyclone
82, 90a, 90b combustible gas line
84 char recovery line
86, 86a, 86b filter device
92, 92a, 92b char exhaust device
94, 94a, 94b filter backwashing unit
100 control device
104 container
106 partition board
108 element
110, 110a, 110b gas injection device
111, 181 nitrogen feed source
112, 112a, 112b nozzle
114, 114a, 114b nitrogen feeding line
116, 116a, 116b control valve
122a, 122b differential pressure gauge
160, 160a, 160b char exhaust line
162, 162a, 162b lock hopper
164, 164a, 164b receiving valve
166, 166a, 166b control valve
168, 168a, 168b nitrogen feeding device
169, 169a, 169b deposition amount detection device
182, 182a, 182b nitrogen feeding line
184, 184a, 184b control valve

The invention claimed is:

1. A method of filter backwashing using a filter backwashing unit disposed in a path in which process gas flows to remove at least a part of trapped dust included in a process gas by backwashing an element of a filter device configured to trap the dust when a process gas passes, the method comprising:
  detecting a parameter used for determination of a state of dust adhering to the element;
  estimating a thickness of dust based on a result of detection of the parameter; and
  injecting backwashing gas and determining an interval at which the element is backwashed based on the estimated thickness of the dust, wherein
  the detecting includes detecting an amount of dust deposited in a lock hopper temporarily storing therein dust exhausted from the filter device, and
  the estimating includes estimating the thickness of the dust of the element based on a timing when the gas injection device injects the backwashing gas and based on a change in the amount of deposition of the lock hopper detected by the deposition amount detection device, and determines the interval based on the estimated thickness of the dust.

2. The method according to claim 1, wherein
the estimating determines the interval based on the estimated thickness of the dust and a predetermined limit for the dust adhering on a surface of the element.

* * * * *